United States Patent

[11] 3,597,586

| [72] | Inventor | Stephen M. Rebovich |
|---|---|---|
| | | 8754½ Rose St., Bellflower, Calif. 90706 |
| [21] | Appl. No. | 812,991 |
| [22] | Filed | Apr. 3, 1969 |
| [45] | Patented | Aug. 3, 1971 |

[54] MOUNTING APPARATUS FOR ANTI-
CONDENSATION MIRROR
2 Claims, 8 Drawing Figs.

[52] U.S. Cl............................................. 219/219,
219/201, 219/213, 248/466, 248/475
[51] Int. Cl............................................. H05b 1/00
[50] Field of Search.................................. 219/219,
345, 213, 201; 248/224, 466, 475—478, 220-5

[56] References Cited
UNITED STATES PATENTS

| 1,908,147 | 5/1933 | Hoegger | 248/466 X |
| 2,075,588 | 3/1937 | Meyers | 40/152 |
| 2,564,836 | 8/1951 | Elsenheimer | 219/219 |
| 2,815,433 | 12/1957 | Zumwalt | 219/219 |
| 2,928,199 | 3/1960 | Novak | 248/466 X |
| 3,117,353 | 1/1964 | Edwards | 248/224 X |
| 3,125,316 | 3/1964 | Wilmhoff | 248/475 |
| 3,160,736 | 12/1964 | Catlerson | 219/219 |
| 3,384,977 | 5/1968 | Rosenberg | 219/219 X |

FOREIGN PATENTS

| 713,438 | 7/1965 | Canada | 248/475 |

Primary Examiner—J. V. Truhe
Assistant Examiner—C. L. Albritton
Attorney—Fulwider, Patton, Rieber, Lee and Utecht ABSTRACT: Mounting apparatus for an anticondensation mirror of the type which includes an electrically energized heating pad mounted against the back of the mirror for heating the mirror sufficiently to prevent water vapor condensation, the mounting apparatus comprising a bracket carried by the mirror and characterized by a downwardly and rearwardly inclined inner surface engageable with a plate adapted for mounting on a wall or the like. The inclined surface of the bracket tends to urge the mirror in tightly seated relation against the wall. Moreover, the plate is integral with a conventional junction box whereby the load carrying capacity of the plate is increased. One embodiment includes a continuous extruded molding which not only defines the bracket, but also provides a perimetrically continuous channel within which the margins of the mirror components are securely held.

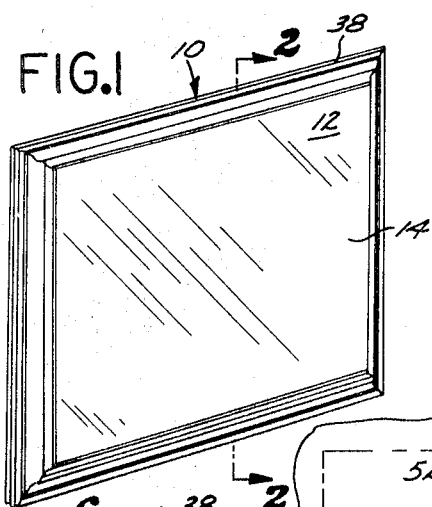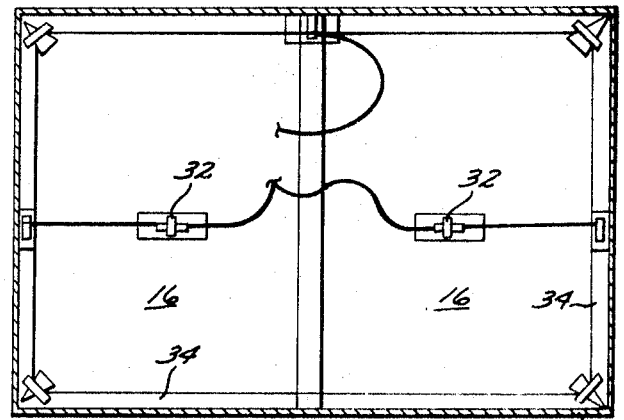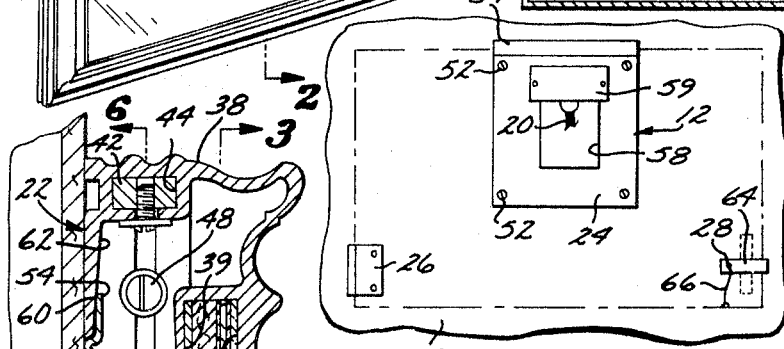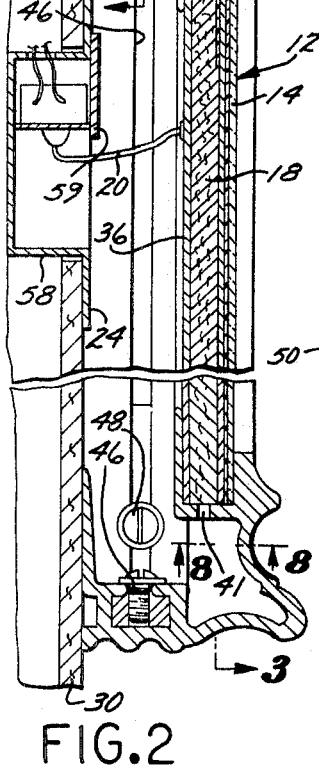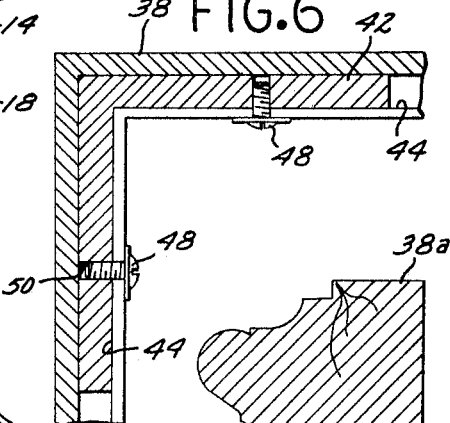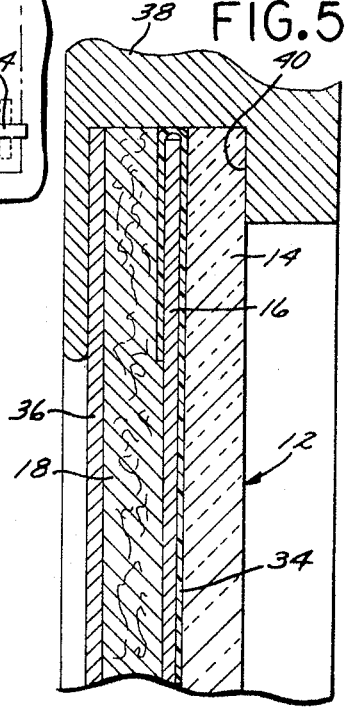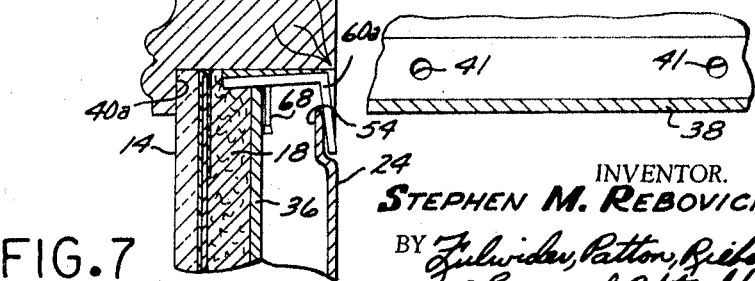
INVENTOR.
STEPHEN M. REBOVICH
BY Fulwider, Patton, Rieber, Lee and Utecht
ATTORNEYS

MOUNTING APPARATUS FOR ANTI-CONDENSATION MIRROR

BACKGROUND OF THE INVENTION

1. Field of Invention

Mounting apparatus for securing the components of an anticondensation mirror to one another and upon a wall or the like.

2. Description of Prior Art

In the average residence the bathroom tub or shower is located relatively close to the mirror so that normal use of hot water in the tub or shower increases the rate of water condensation upon the cool surface of the mirror. The resultant fogging of the mirror obscures the mirror reflection, and requires repeated wiping away of the water condensation. Alternatively, the bathroom has to be ventilated to carry away the vapor-laden air and to reduce the temperature of the air to a temperature close to that of the mirror surface.

Anticondensation mirrors have been proposed in which a heating means is mounted upon the back of the mirror plate to raise the temperature of the mirror plate to the approximate temperature of the air water vapor atmosphere. With this arrangement, the mirror plate surface has no cooling effect upon the atmosphere, and a saturation condition and consequent condensation on the mirror plate is avoided.

Heretofore, means for mounting such a mirror have been relatively complex and expensive, and often unreliable. Usual mirror hooks and the like tear out of the plaster of the usual bathroom wall, prevent the mirror from lying flat or tight against the wall, and are time consuming to install. The most important consideration, however, is that the means for securing the electrically energized mirror be absolutely reliable in preventing the mirror from falling off the wall, and provide for suitable connection to an electrical junction box. In special applications it is also desirable to provide some means to prevent the mirror from being stolen, as in motels and the like.

SUMMARY OF THE INVENTION

The mounting apparatus of the present invention is particularly adapted for use with an anticondensation mirror of the type which includes a reflective mirror plate, an electrical resistance heater overlying the rear surface of the mirror plate, thermal insulating material overlying the heating means, and electrical circuit components for connection of the heating means to a source of electrical power. The mounting apparatus includes a bracket assembly carried by the mirror and including a clip portion adjacent the top of the mirror, which clip portion is characterized by a downwardly and rearwardly inclined inner surface. In addition, the mounting apparatus includes a mounting plate for securement to a wall or the like, and including an offset, horizontally oriented edge which defines a clip recess for receiving the clip portion of the mirror bracket. Interengagement of these components causes the mirror to slide upon the inclined surface of the clip portion so that the mirror seats tightly against the wall.

One embodiment of the mounting apparatus also provides an electrical junction box integral with the mounting plate, with the junction box being adapted to seat within an opening in the adjacent wall, whereby the load carrying capacity of the plate is greatly increased. In addition, the mirror bracket can also be provided with additional clip portions adjacent the opposite sides of the mirror for engagement with complemental mounting plates fastened to the wall, one of the side plates being pivotable so that it can be pivoted into engagement with its associated clip portion after the opposite edge and the top edge of the mirror are already located in position. This prevents the mirror from being stolen in public establishments such as motels and the like.

The particular design of the present mounting apparatus enables the various components thereof to be inexpensively fabricated and quickly assembled to secure the mirror components together and against the supporting wall. In this regard, one embodiment of the invention provides a perimetrically continuous molding having a channel within which the margins of the mirror components seat for securement together. The molding is provided with a continuous flange which provides the bracket for engagement with the mounting plate upon the supporting wall. With this arrangement, the continuous flange enables the mirror to be hung in various orientations.

Other objects and features of the invention will become apparent from consideration of the following description taken in connection with the accompanying drawing.

BRIEF DESCRIPTION OF THE DRAWING

FIG. 1 is a perspective view of a mirror mounted to a usual bathroom wall with mounting apparatus according to the present invention;

FIG. 2 is an enlarged view taken along the line 2-2 of FIG. 1, portions thereof being omitted for brevity;

FIG. 3 is a view on a reduced scale, taken along the line 3-3 of FIG. 2;

FIG. 4 is a front elevational view, on a reduced scale, illustrating the mounting plates on the supporting wall;

FIG. 5 is an enlarged transverse cross-sectional view, illustrating the seating of the mirror components within the molding channel;

FIG. 6 is a view taken along the line 6-6 of FIG. 2;

FIG. 7 is a partial transverse cross-sectional view illustrating a second embodiment of the present mounting apparatus; and FIG. 8 is a view taken along the line 8-8 of FIG. 2.

DESCRIPTION OF THE PREFERRED EMBODIMENTS

Referring now to the drawing, there is illustrated a mounting apparatus 10 according to the present invention and adapted for use in conjunction with an anticondensation mirror 12 which includes a reflective mirror plate 14, an electrical resistance heater 16 overlying the rear surface of the mirror plate 14, a thermal insulating blanket 18 overlying the rear face of the heater 16, and an electrical circuit including a line cord 20 for connection of the heater 16 to a source of electrical power (not shown).

As previously indicated, it is important in the installation of an electrically energized assembly, such as the mirror 12, to insure that the energized apparatus is securely fixed in position so that it will not fall and possibly electrically shock the user in the process.

In this regard, the mounting apparatus 10 comprises, generally, a bracket 22 carried by the mirror and mounting plates 24, 26, and 28. As will be seen, the bracket 22 and plates 24, 26, and 28 interengage to securely mount the mirror 12 flat or tightly against the bathroom wall, which is indicated at 30.

The mirror plate 14 is of conventional construction, with the rear surface thereof silvered. The heater 16 may take any of a variety of forms, but is preferably a flat sheet of asbestos material which incorporates an electrically resistive graphitic compound, and with spaced electrodes or bus bars (not shown) at its opposite edges. As will be apparent, application of electrical energy to the bus bars results in heating of the intermediate surface of the asbestos sheet. As best seen in FIG. 3, two of the heaters 16 are employed in the larger mirrors, with the amount of heat to be generated by the heaters being controlled by usual thermostats 32 which rest against the rear surfaces of the heaters 16, and which are adjusted so as to elevate the temperature of the mirror plate 14 sufficiently to prevent water condensation.

Each heater 16 is preferably covered by a protective, waterproof sheet made of any suitable material, such as "Mylar" or a polyester film 34. The film 34 prevents any possible water condensation from reaching the heater 16 and causing electrical short-circuiting.

The thermal blanket 18 is simply a sheet of material to prevent heat loss from the heater 16, and may be made of fiber glass or the like. The mirror components also include a metal sheet 36 which is pressed against the rear surface of the thermal blanket 18. The sheet 36 provides an electrical ground, and the ground lead (not shown) of the line cord 20 is attached to the sheet 36 to protect the user from electrical hazards.

In the embodiment illustrated the various mirror components are rectangular in configuration and are secured together by four sections of molding 38 which constitute a part of the mounting apparatus 10.

As best illustrated in FIG. 2, each molding section 38 serves as a bracket by means of which the mirror 12 is hung upon a wall 30. More particularly, each section 38 is preferably made of extruded aluminum for light weight and is ornamentally configured to provide a pleasing appearance. In addition, the front portion of each molding section 38 includes a continuous channel 40 which receives the margins of the plate 14, the heater 16 with its covering film 34 and mounted thermostats 32, the blanket 18, and the sheet 36, to secure such components in position. The lowermost section of the channel 40 includes drain holes 41 to allow any water condensation to run off, thereby eliminating any possible electrical short-circuiting. Such water condensation might occur during periods when the heater 16 was not energized. In addition, the inner wall 39 which defines the channel 40 is wider than the outer wall of the channel, which facilitates assembly of the components. The inner wall 39 of the respective molding sections 38 is simply placed upon the assembled components, pressed downwardly upon them, and then urged inwardly to fit the components within the channels 40 of the four sections 38.

The assembly is made by pressing the sections 38 onto the four sides of the rectangular mirror components, and the beveled corners of the sections 38 are then secured together by four right angular connectors 42, as best viewed in FIGS. 2 and 6. Preferably the sheet 34 is folded at the corners, in the manner best shown in FIG. 3, to reduce any possible moisture penetration through the corners of the assembly.

The legs of each connector 42 fit within complemental channels 44 formed in the adjacent extremities of the sections 38 secured together by the particular connector 42. The open portion of each channel 44 is a narrow slot 46 through which a headed bolt 48 is disposed for engagement within a complemental threaded opening 50 in the adjacent leg of the associated connector 42. The bolts 48 securely fasten the connector 42 to the adjacent molding sections 38 so that separation therebetween cannot occur. This securely holds the mirror components in position, and enables the components to be quickly disassembled if necessary.

The mounting plate 24 is adapted to be secured to the wall 30 by a plurality of mounting screws 52, as seen in FIG. 4, and includes an offset, horizontally oriented upper edge or lip 54 which defines a clip recess with the wall 30.

The plate 24 preferably includes an integral electrical junction box 58 which fits within a usual opening in the wall 30. The integral box 58 increases the load bearing capacity of the plate 24 so that much heavier or larger mirrors 12 can be accommodated by the present mounting apparatus 10. The upper portion of the box 58 houses the electrical outlet wiring, and is closed by a small front plate 59 held in place by usual screws.

Each molding section 38 of the bracket 22 includes an inwardly oriented flange or clip portion 60 which is characterized by a downwardly and rearwardly inclined inner surface 62. As best viewed in FIG. 2, the clip portion 60 located adjacent the top of the mirror engages the lip 54 of the plate 24 when the mirror 12 is first hung in position, and the weight of the mirror thereafter causes a sliding of the inclined surface 62 upon the lip 54 to firmly and tightly seat the mirror 12 against the wall 30.

The vertically oriented or side molding sections 38 are similarly configured and include clip portions 60 (not shown) which similarly fit within clip recesses (not shown) defined by the extremities of the side mounting plates 26 and 28, respectively. In operation, the upper clip portion would first be fitted within the clip recess of the mounting plate 24, and the clip portion of the side molding section 38 would be fitted into the clip recess of the mounting plate 26. The mounting plate 28 is pivotally mounted to the wall at 64, and a wire, string, or cord 66 is attached to the inner end of the plate 28. This enables the plate 28 to be pivoted from the dotted position shown in FIG. 4 to the full line position by simply pulling on the cord 66. This orients the clip portion of the adjacent molding section 38 within the clip recess of the mounting plate 28. The protruding extremity of the cord 66 can then be cut off so that it is not possible for the mirror to be easily removed by unauthorized persons.

An alternative mounting apparatus utilizes four molding sections 38a made of wood and including a channel 40a within which the mirror components are received. A plurality of brads or nails 68 are employed to secure the mirror components in this position. In addition an elongated angle is also secured to the molding 38a by the nails 68, with the rearward leg or clip portion 60a of the angle being inclined such that its inner surface is downwardly and rearwardly inclined in the same manner as the surface 62 of the first embodiment. This arrangement permits the mirror to be pulled firmly and tightly against the wall upon engagement of the clip portion 60a with the associated mounting plate 24.

Although not shown, any suitable wall switch may be employed for energizing the heater 16 at desired times.

From the foregoing it will be seen that a mounting apparatus 10 has been provided which is economical to fabricate and easy to assemble to securely hold the components of the mirror 12 together and to mount such components firmly and tightly against the wall 30. Moreover, the unique nature of the extruded molding sections 38 enables the mirror 12 to be hung from its top, bottom, or either side, since each of the molding sections 38 is characterized by a clip portion 60.

Various modifications and changes may be made with regard to the foregoing detailed description without departing from the spirit of the invention.

I claim:

1. In combination, a reflective rectangular mirror plate, electrical resistance heating means incorporating an electrically resistive graphitic compound in sheet form overlying the rear surface of said mirror plate, thermal insulating material overlying said heating means, electrical circuit means for connection of said heating means to a source of electrical power to thereby heat said mirror plate and prevent condensation thereon;

bracket means including a perimetrical channel in four sections and receiving the margins of the mirror components comprising said mirror plate, said heating means, said insulating material, and said circuit means, said bracket means further including a continuous flange in at least one section of said channel, said flange having a downwardly and rearwardly inclined inner surface; and an electrical junction box for location within a complemental opening in a wall whereby the base of said box bears against the lower margin of said opening, said box including an integral plate for disposition against said wall, said plate including an offset, horizontally oriented edge to define a clip recess between said edge and said wall whereby engagement of said clip portion on said edge enables said inclined surface to slide downwardly and rearwardly on said edge and thereby seat said bracket means tightly against said wall, the weight of said mirror components being transferred through said plate and said junction box to said wall.

2. The combination of claim 1 wherein said channel is defined by a perimetrical extruded molding having an outer leg and a wider inner leg, the wider inner leg enabling compression of said mirror components thereagainst to facilitate insertion of said mirror components into said sections of said channel; said extruded molding integrally including said flange, the cross section of said molding being uniform so that said flange is perimetrically continuous whereby said mirror components may be supported upon said junction box plate at any one of said four sections of channel.